(12) United States Patent
Suriyanarayanan

(10) Patent No.: US 7,974,211 B2
(45) Date of Patent: Jul. 5, 2011

(54) METHODS AND APPARATUS FOR NETWORK CONFIGURATION BASELINING AND RESTORATION

(75) Inventor: Muthukumar Suriyanarayanan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 11/651,600

(22) Filed: Jan. 10, 2007

(65) Prior Publication Data

US 2008/0101419 A1 May 1, 2008

(30) Foreign Application Priority Data

Oct. 30, 2006 (IN) .......................... 1983/CHE/2006

(51) Int. Cl.
*H04L 12/28* (2006.01)
*G06F 15/177* (2006.01)
(52) U.S. Cl. ......... 370/252; 370/255; 709/220; 709/222
(58) Field of Classification Search .................. 370/250, 370/252, 254, 255; 709/203, 220–224, 248; 713/100, 400, 600
See application file for complete search history.

(56) References Cited

U.S. PATENT DOCUMENTS

| | | | | |
|---|---|---|---|---|
| 6,108,800 A * | 8/2000 | Asawa | ............................. | 714/47 |
| 6,182,022 B1 * | 1/2001 | Mayle et al. | ................... | 702/182 |
| 6,269,396 B1 * | 7/2001 | Shah et al. | .................... | 709/223 |
| 6,453,426 B1 * | 9/2002 | Gamache et al. | ................. | 714/4 |
| 6,801,940 B1 * | 10/2004 | Moran et al. | ................... | 709/224 |
| 2003/0185148 A1 * | 10/2003 | Shinomiya et al. | ........... | 370/216 |
| 2005/0066020 A1 * | 3/2005 | Wechter et al. | ............... | 709/223 |
| 2005/0083895 A1 * | 4/2005 | Pinault | .......................... | 370/338 |

* cited by examiner

*Primary Examiner* — Aung S Moe
*Assistant Examiner* — Redentor Pasia

(57) ABSTRACT

A method of baselining a network topology including at least one network device and one application node from and to which data from the network device may be sent using a network protocol. The method includes the steps of providing a network-wide time reference ensuring clock synchronicity of all the network devices and at the application node with the network-wide time reference. The method further includes causing configuration information to be collected at the application node from all network devices at a particular time or within a predetermined time slot, determining the number of networks supplied such configuration information and comparing this number against a stability threshold value. Finally, the method includes storing the configuration information together with an indication that such is stable, and thus usable in providing a reliable baseline, only if the stability threshold value is met or exceeded.

14 Claims, 7 Drawing Sheets

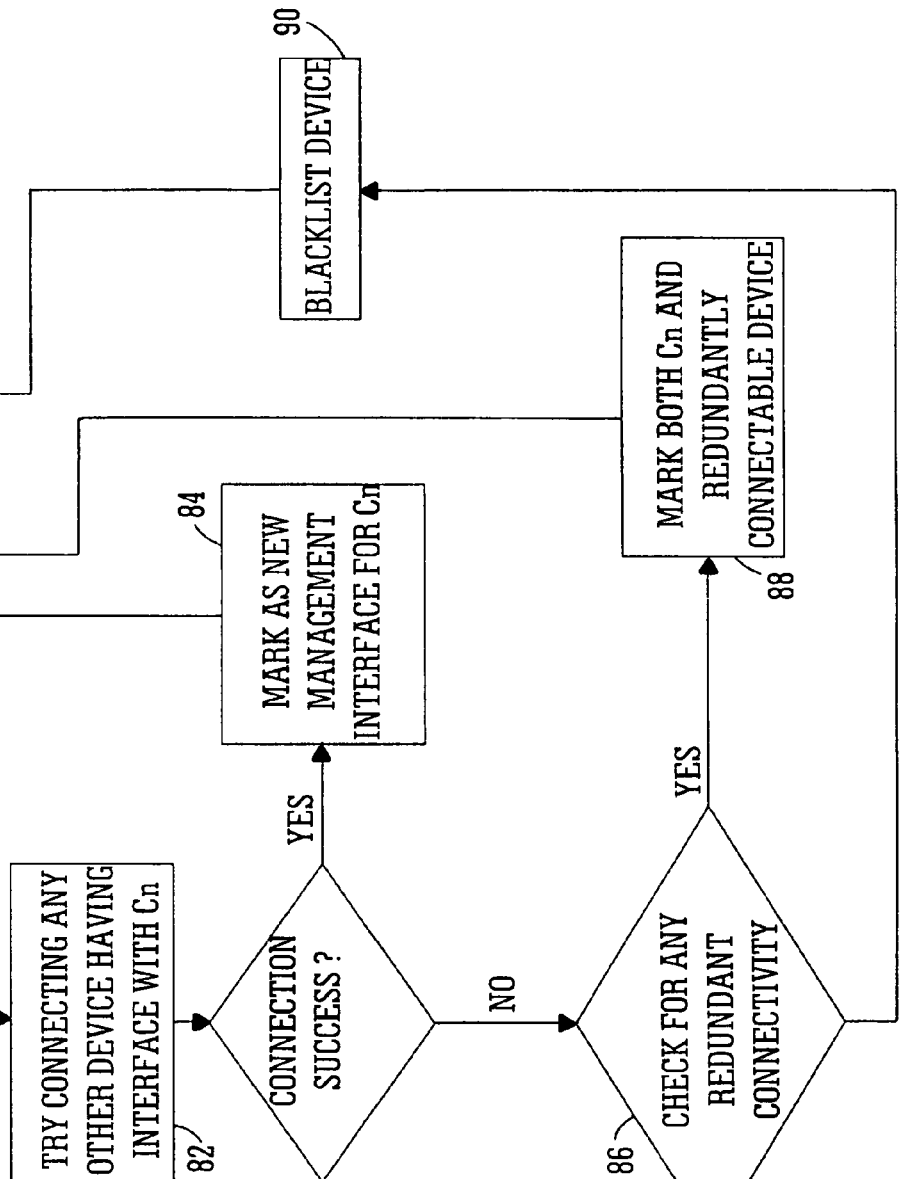

METHODS AND APPARATUS FOR NETWORK CONFIGURATION BASELINING AND RESTORATION

This application claims priority from Indian patent application 1983/CHE/2006, filed on Oct. 30, 2006. The entire content of the aforementioned application is incorporated herein by reference.

BACKGROUND OF THE INVENTION

The baselining of networks is known in the art. Indeed, HP currently markets and sells software known as HP Openview Network Node Manager (OvNNM) which can perhaps be regarded as the industry-standard network management toolset. This software, typically installed on one or more servers in a large, dynamically changing switched network, is designed to provide network management and troubleshooting facilities to a network manager or administrator. Primarily, the software provides a means of discovering a network, and in particular is capable of mapping the various devices which form part of the network and displaying the topology of such devices in an easily comprehensible, graphical manner. Information discovered during any particular discovery task is stored in a suitable repository, locally or remotely, and briefly will include some indication of the type of device, the configuration information stored in that device, and details of the connections that device makes with other devices on the network. Larger networks are in a constant state of flux as they shrink or grow depending on demand for IT resources. Network administrators for different sites require flexibility in their roles, and accordingly network devices may be installed or removed with little or no notification to the remainder of the network at large. Also, so-called network "outages" or periods of malfunction may occur from time to time as a result of other network events such as particularly or unusually high traffic, firmware upgrades, device replacement or simple failure of devices.

Other currently available topology baselining solutions may maintain configuration data relating to devices on the network, but tend to function at the device level as opposed to the network level. For instance, with such solutions, if configuration data is collected from two interdependent or interlinked network devices at two different times, it may not be possible to achieve complete restoration of the network infrastructure based on the stored configuration data for these devices.

BRIEF DESCRIPTION OF THE DRAWINGS

By way of example, embodiments of the invention will be described with reference to the following drawings, wherein.

DETAILED DESCRIPTION OF EMBODIMENTS OF THE INVENTION

Figure 1:
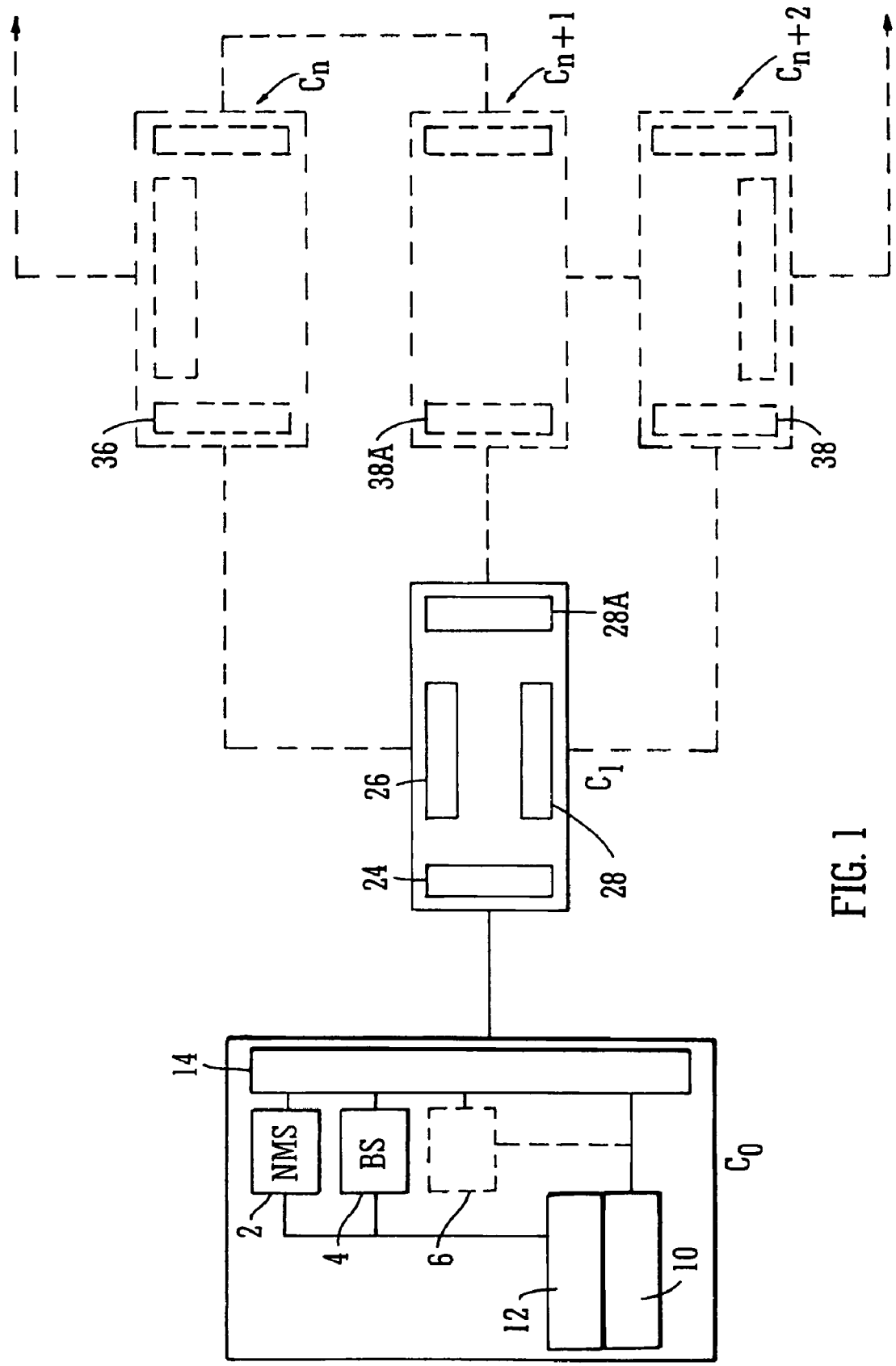
FIG. 1 shows a schematic layout of a portion of an enterprise network.

There will be described a method for reliable automatic baselining of network topology, and a method for automatic dynamic network restoration using baselined data gathered during the baselining process. Also described will be a means for validating an attempted network topology restoration process against the baselined data obtained prior to the restoration attempt.

In the following the term "network device" will be used to refer to network infrastructure components such as bridges, routers, gateways, managed switches, and indeed any device which is capable of propagating a network beyond a geographical, physical, or other virtual boundary such as that imposed by Internet Protocol (IP) addressing and different network segments.

It is also to be mentioned that the type of device to which the techniques to be described are applicable is that which is provided with a means of transmitting and receiving device management and configuration information across the network, in addition to carrying standard network traffic. To this end, the vast majority of devices currently installed in large networks are provided with an embedded Simple Network Management Protocol (SNMP) software module, possibly embedded in read only memory (ROM) capable of responding to "GET" or "SET" type query instructions. SNMP is a primitive protocol but offers sufficient functionality for programs like ONNM to discover the topology of an enterprise network, together with the various different types of configuration information stored in the devices which enables them to carry out their network function. An example of such information is the routing table, and the static IP addresses stored in a router.

It will be understood from what follows that implementations are possible where alternative protocols or means of discovering device existence and configuration information, such as by use of the "telnet" protocol and using command line interface (CLI) programs. Also covered is the ability to baseline virtual network services as well as physical devices.

In a first embodiment of the invention, and referring to FIG. 1, there is shown a schematic layout of an enterprise network consisting of a first main server $C_0$, on which various different applications can execute, and thus may hereinafter be referred to as an application node. Within $C_0$, such applications are represented at 2, 4, 6, with at least one such application being a Network Management System (NMS) application (such HP OpenView Network Node Manager), and a further component being a modular baselining software (BS) component, which interacts closely with the NMS application. In addition, a fully or partially loaded operating system (O/S) may be required for the preceding applications to execute correctly, but it is to be mentioned that this is not always mandatory, especially where the such programs are intended to execute prior to the loading of the operating system, such as, for example, immediately after the Basic Input/Output System (BIOS) check and execution.

For the purposes of this description, the server $C_0$ is also provided with a clock 10 to which all other devices on the network will be synchronised. Accordingly, said clock 10 will be considered to provide a reference network wide time. An internal hard drive 12 is also provided inside the server $C_0$ to provide an accessible storage means through which baseline information collected by the BS component can be stored for later use. Of course, the particular location of the storage facility is critical only in terms of being permanently accessible by the NMS and BS components, regardless of the state of the network.

The various NMS and BS components interface with a network interface layer(s) 14 which in turn allow traffic to be transmitted and received along a physical network link 16. It is to be noted that the interface 14, being important to the functioning of the network must thus form part of the network, and may therefore be baselined in any baselining process. Alternatively, the interface 14, its configuration, and existence, may be otherwise hardcoded or manually configured within the NMS software application.

From FIG. 1, it can be seen that the interface 14 communicates directly with a corresponding interface 24 within a first network device C1, which in turn is connected to second and further network devices Cn, Cn+1, Cn+2. The number of connections which each of these first or second and subsequent network devices make with physical PCs and other so called "non-network" devices is not shown in the figure, firstly because these devices merely request and transmit data for processing, as opposed to providing any network segmentation, and secondly because it is possible to have hundreds of such network devices in the enterprise network and their illustration is unnecessary in terms of the present invention.

Network device $C_1$ has further interfaces 26, 28, 28A (three are shown, but there may be only one), and such interfaces in turn communicate with corresponding interfaces 36, 38, 38A in the second and further network devices $C_n$, $C_{n+1}$, $C_{n+2}$, respectively. As will be appreciated, the network topology shown in FIG. 1 is essentially of the tree type, with a mesh element connecting device $C_n$ with device $C_{n+1}$, but it will similarly be appreciated that the present techniques can be applied to any desired network topology.

Network level techniques are primarily employed in baselining because the vast majority (if not all) of the network devices currently employ SNMP as their management protocol, and thus can be interrogated and configured in a generally standard manner. An additional component may be provided in the server to provide device level support in the event that any of the devices are configured or interrogated in non-standard manner.

Figures 2A, 2B:
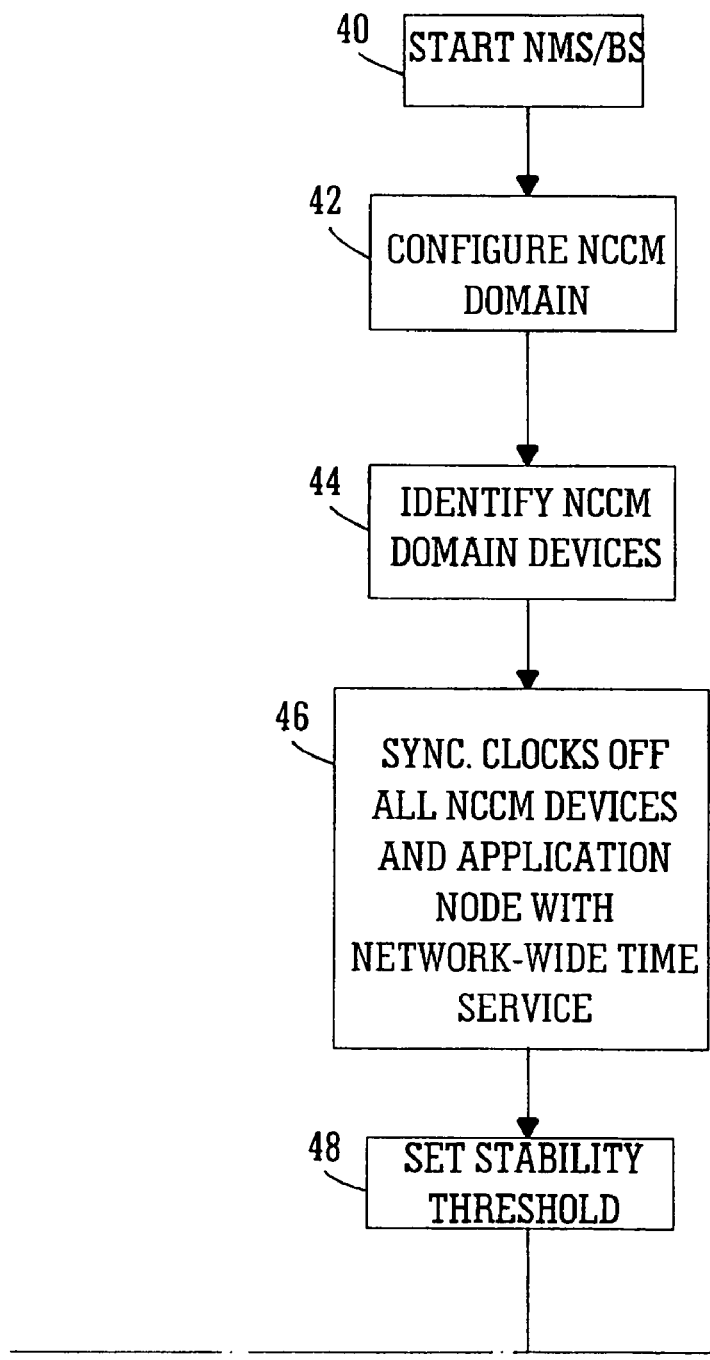
FIG. 2 provides a flowchart diagram showing various process steps in a baselining procedure, and FIG. 3 provides a flowchart diagram showing various process steps in conducting a restoration procedure.
Figure 2B:
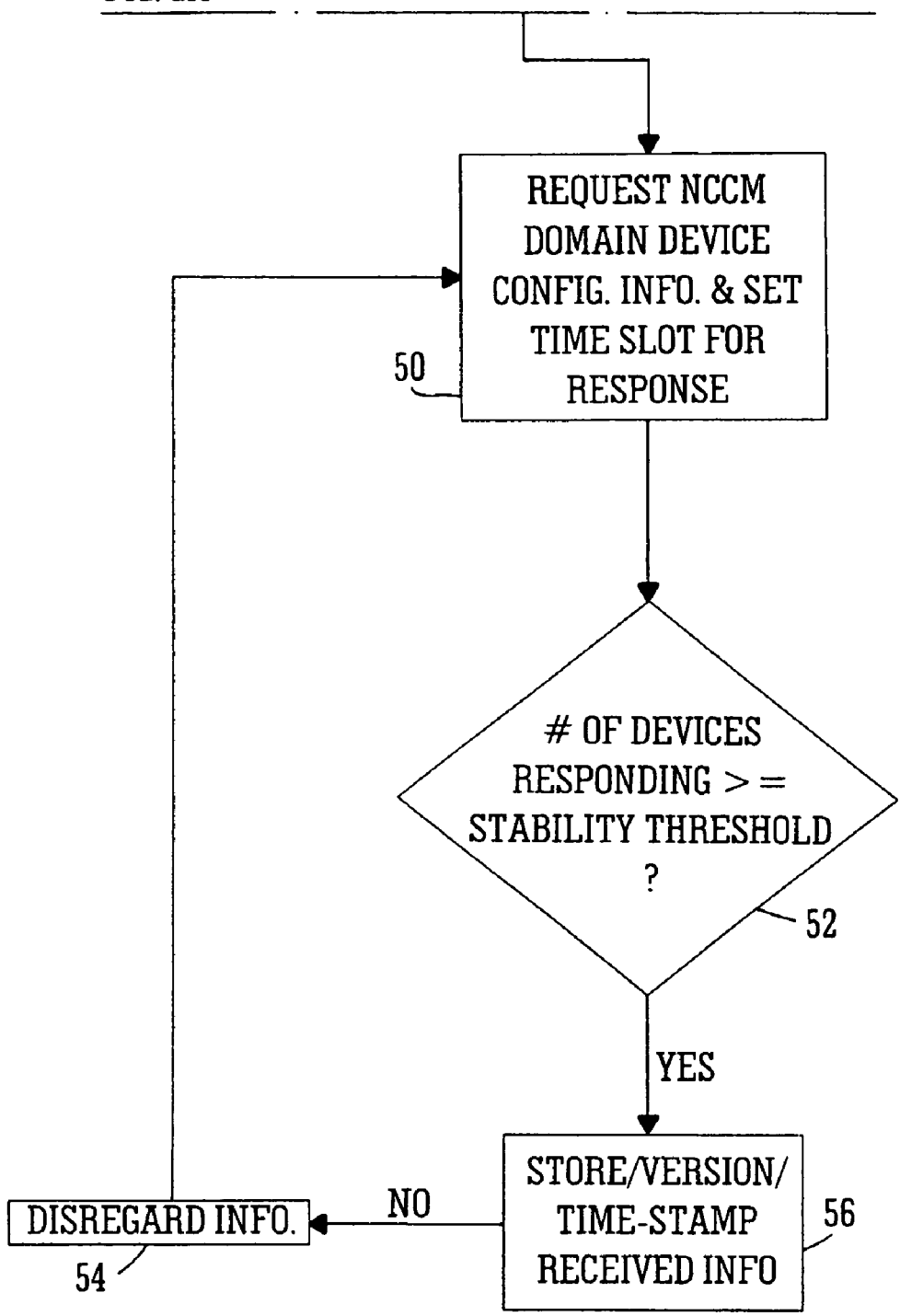

In order to commence a baselining procedure, the NMS and the baseline software component with which it interacts with must be running, as shown at 40 in FIG. 2. A next step is to define and configure a Network Configuration and Change Management (NCCM) domain, and identify which of the devices in the entire network is to be included in the NCCM domain, as at 42, 44. The various devices so identified may have their clocks synchronised with the network-wide time service (in this case the clock in the server), as at 46. In practice, a user interface of the NMS or BS provides a means whereby the user can define the NCCM domain by identifying one or more (usually all) of the devices from the network infrastructure, i.e. devices $C_1$-$C_{n+2}$.

The BS component operates at the server side in association with the NMS. The BS component is responsible for collecting configuration information from each of the devices in the NCCM domain, and storing it along with the snap shot of the NMS provided topology at any given time.

The NMS component performs a topology discovery process and cooperates with the BS component to not only provide topology information but also relevant device configuration information for each of the devices in the NCCM domain. The retrieval of configuration information (50) can be achieved by the following methods:

1. The devices in the NCCM domain are programmed to send their configuration information dump to the server at scheduled time intervals. Since the time is synchronized, the collection of such configuration dumps forms the overall network configuration. This configuration is received by the server side BS component, and stored or versioned. In this model, the device could leverage the existing traps/ unsolicited message framework to transport the configuration data.

2. The server BS component could make a Configuration dump request to all the devices participating in the NCCM to send their data at a requested time slot;

3. Alternatively the server BS component can scan all the configuration repositories (i.e. network device interfaces) at a synchronized time, and store the information accordingly;

In all the above alternatives, a certain stability threshold value is prescribed (48) according to either one of the following two policies, which are applied (52) in baselining the collected data. Regardless of the policy chosen, the NMS provided topology is frozen and a copy of it is preserved along with the configuration data.

Policy 1) The data is considered stable only if the configuration information is received from all the devices within a synchronized time slot, i.e. the stability threshold value equals the sum total of all the network devices forming the topology. Even if a single device did not provide such information, or said device is not operational, the configuration data is considered non synchronized and all the data is dropped pending the next stable iteration (54).

Policy 2) A threshold of stability is defined by the user with respect to the tolerance of number of non-confirming devices. If the non-conformance matches or exceeds the threshold, the data is accepted, but the non-conforming devices and their inter-dependencies with other conforming devices are removed from the snap shot topology preserved along with the configuration. In the event of restoration of the topology, only the restoration of the conforming devices is attempted.

Policy 2a) A variation of the above policy is possible in which the non-conforming devices are still tolerated and they are not removed from the topology; rather, they lead to a low overall quality of restoration of the network.

Any one of these policies could be selected which would lead to deciding the 'stable baseline configuration and the associated network topology' (hereinafter referred as Based Lined Configuration [BLC] and Base Lined Topology [BLT]). The stable configuration and the associated topology is stored in the server in a retrievable persistent storage (56).

In an embodiment, the software component residing in the device, being that component which effectively provides the interface in the network device and which allows for both network traffic and SNMP communication with other devices, could assist the data collection process by either proxying or easing out some of the configuration collection processes.

Generally the configuration information is provided as part of SNMP MIB (Management Information Base). So, if the collection of configuration information is a "pull" by BS, the BS would consult the MIB to collect the data. If the configuration information collection is by "dump" by the device via SNMP Trap, the configuration information would be the payload of the trap.

Figures 3A, 3B:
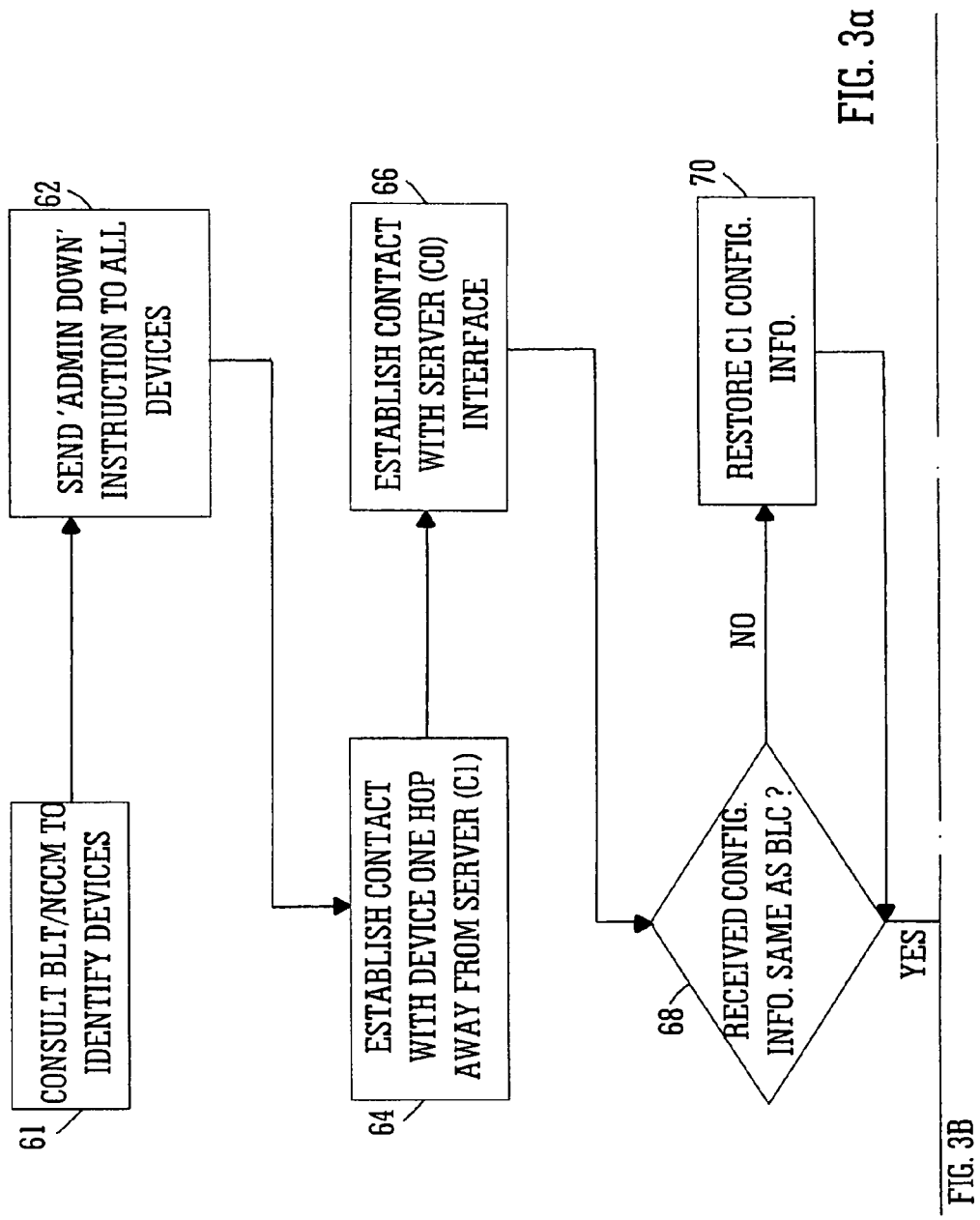
Figure 3B:
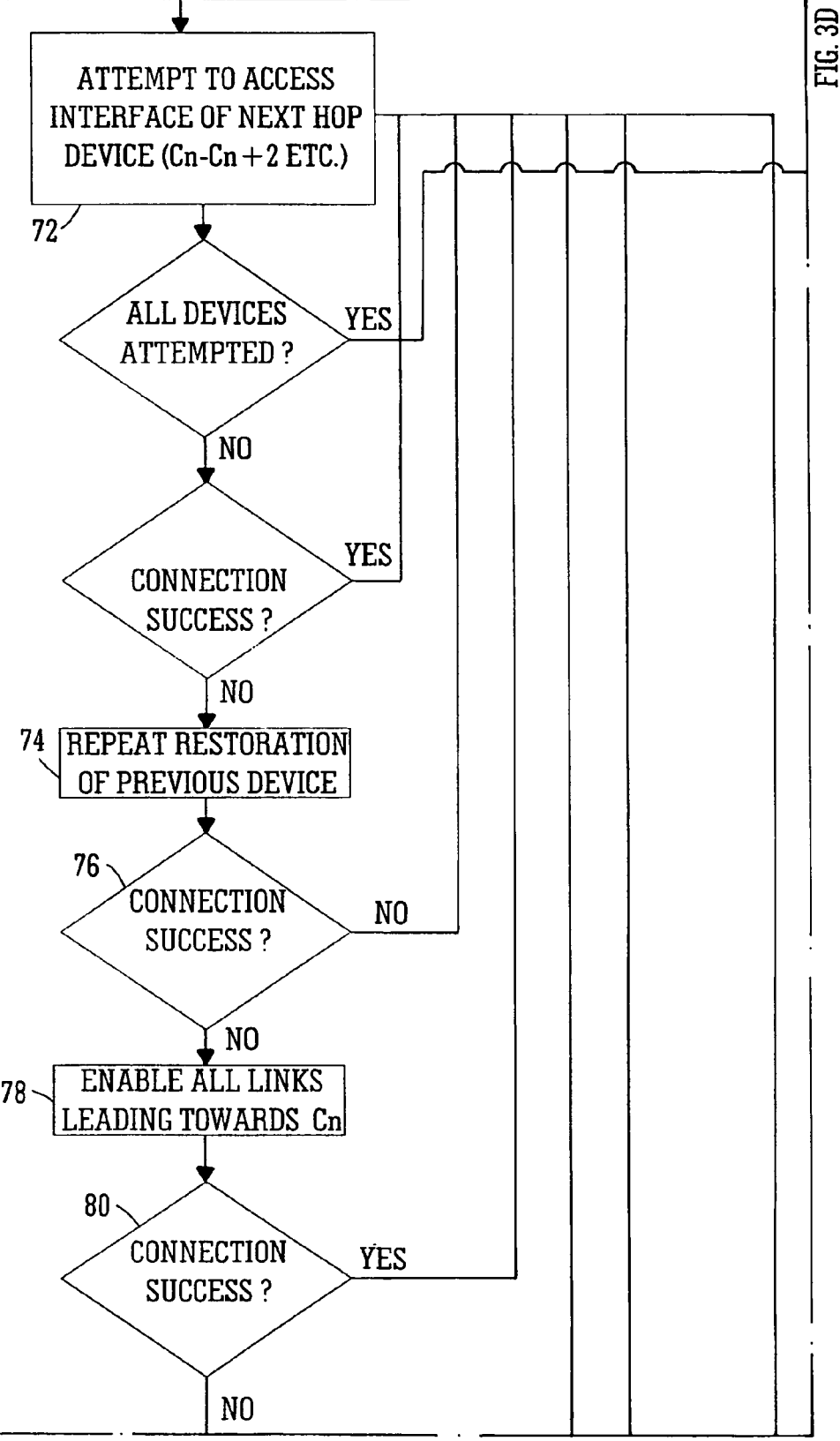
Figure 3D:
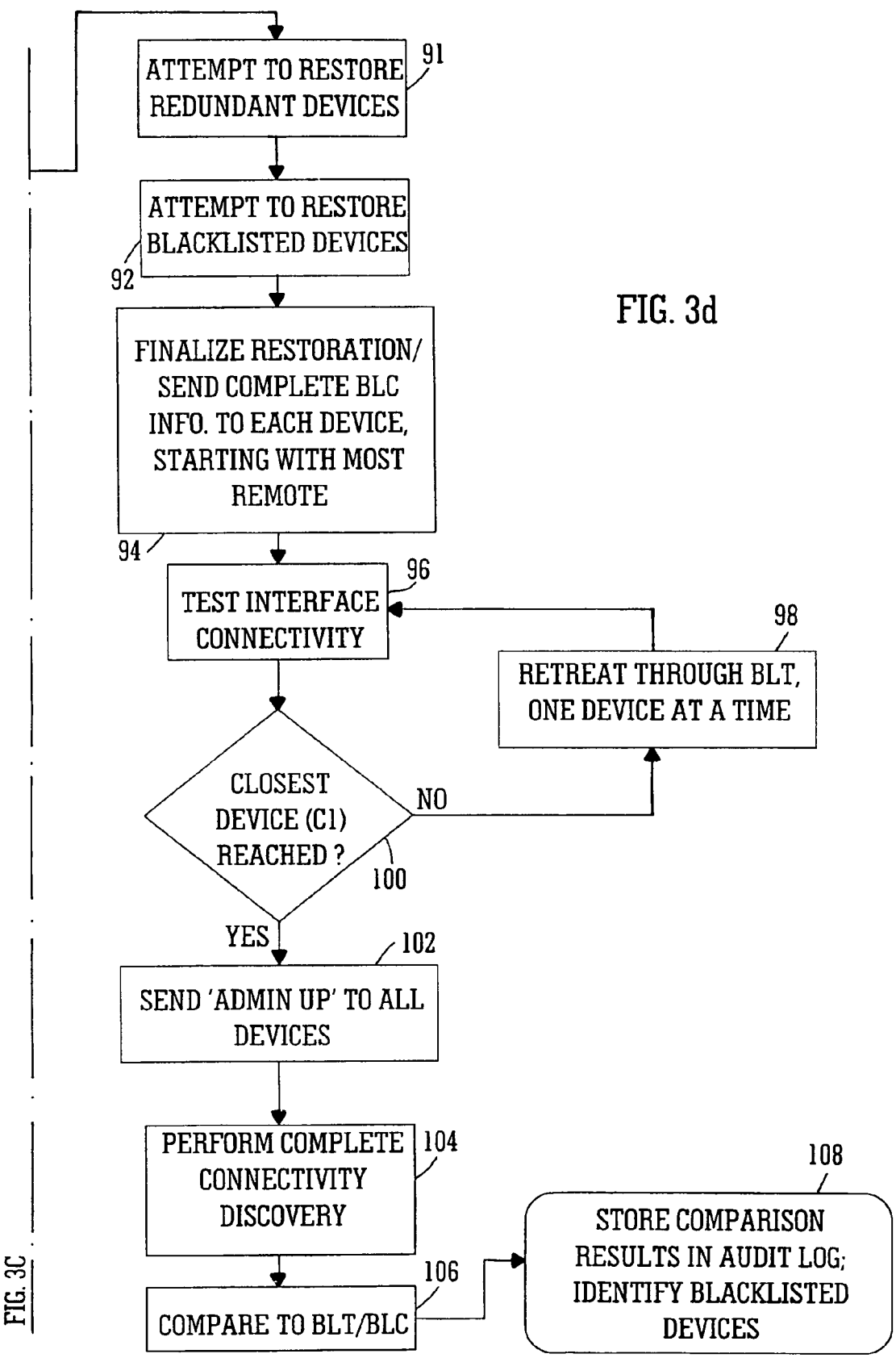

The restoration procedure will now be described with reference to FIG. 3.

When the network administrator wishes to restore a particular check pointed configuration for the entire network due to some devices failing or having their configuration altered, whether inadvertently or otherwise, the BS component typically controls the process, using the NMS component to retrieve topology information (BLT) whenever required. The BLT is thus considered as the reference information store.

Restoration proceeds according to the following algorithm, the aim of which is to restore the network to the BLT and the network devices to their respective BLCs.

The restoration process depends on the fact that the configuration restoration is possible either via a SNMP SET operation or via other modes of configuration protocol, such as telnet and command line interface (CLI).

When the restoration begins, the network could be
a) Fully Operational, but needs to be restored to a different configuration,
b) Partially operational whereby some devices forming part of the NCCM are operational and some are not, and
c) Fully non functional. (This is not a very practical case as the devices should at least be powered on. In this case, the algorithm does a best effort restoration.)

Step 1: the BS component instructs all the network devices to enter an administrative operational mode, such as an "Admin down" or testing state (because they are now under maintenance).

i. The BLT is consulted (60) to get the list of all the devices which was part of the NCCM domain when the previous baselining procedure occurred. The management interface related information is collected from the BLT;

ii. The server BS component sends 'Admin down' requests (62) either using SNMP SET methods or by contacting the device side software component by suitable means such that the device enters an administrative operational mode or test mode. This is a transient state until the full restoration and helps to reduce noise on the network. The request is sent to all the devices via their management interface previously identified in the BLT. Since the network may be either fully/partially operational, there is no guarantee that the 'admin down' request successfully reaches all the devices. However, there is a reasonable chance that the request reaches at least a sub-set of the BLT devices or of those devices within the NCCM domain. As the restoration proceeds and restores more and more devices, this step is repeated again and again till all the devices are brought to the 'Admin down' or testing state.

Step 2: Establish accessibility to the management interface;

In this step, the algorithm makes an effort to first establish contact with all the devices originally present in the BLT and restore their management interface. This step starts from the server interface 14 (step 64 in FIG. 3) facing the network and the restoration moves progressively from device to device in the direction of the periphery of the network, i.e. towards the edges of the NCCM domain. The BLT is consulted to identify the first hop network interface that needs to be restored (in FIG. 1, interface 24 is one hop from interface 14). As a first step, the current configuration of interface 24 of the device $C_1$ is retrieved (66) and compared (68) with the baselined topology and configuration information. If there has been no change in the configuration, no action is taken by the BS component. However, if the configuration between the baselined information and the actual, real-time information is different, then the configuration is restored (70) as per the BLT.

From the BLT, the device being the next hop away from the device $C_1$ is located, namely $C_n$, and the baselined information for this device is retrieved. At this stage, connectivity to the interfaces 26, 28, 28A will have been re-established from the procedure above, which automatically restores all the interfaces of a device once there is communication between the server interface and the device ($C_1$) management interface 24.

From this point, the BS component operates according to the following algorithm:

Try to access management interface of the next device $C_n$ (72); if the management interface 36 is not reachable, this could be due to the fact that the interface 26 in $C_1$ connecting interface 36 in $C_n$ is not restored; fix the interface 26 in $C_1$ connecting the interface 36 in $C_n$ by repeating the restoration procedure (74) and re-trying (76); If still not accessible, then this could be due to the fact that either the interfaces in $C_n$ are non-compatible with other side of the link from $C_1$ or the interface is down; accordingly, the BLT is consulted and all links leading towards $C_n$ are enabled (78); BS then re-tries (80) interface 36;

If still not accessible, then the BLT is consulted to establish if there are any other interfaces in $C_n$ which might be able to communicate with interface 36; a connection is attempted from the BS component to any such interface (82); if at least one alternate $C_n$ interface is accessible, then that interface is identified as the new management interface for device $C_n$ (84) for the duration of the restoration process;

If no interface is accessible then the BLT is consulted to establish whether the device $C_n$ had any redundant connectivity from any other part of the network (86) (such as, in FIG. 1, from device $C_{n+1}$); in this case, the device $C_n$ is marked as redundantly connectable, along with device $C_{n+1}$ which had redundant connectivity with it (88) and these two devices are moved to a redundant device list by the BS component; additionally, a flag is set such that a later attempt may be made to restore device $C_n$ when restoration of the device $C_{n+1}$ is attempted; If no redundancy between the other network devices and $C_n$ exists, then the device might have been powered down or might have hardware issues. The device is thus flagged for attention by being entered in a 'Black list' (90) of network devices on which the restoration procedure failed.

The restoration process then continues (if possible) on the next device;

Step 2a: After connection attempts have been made on all the devices, and the most important management interfaces have been restored, and are accessible, the BS component may revisit the redundant device list and repeat the steps given above for establishing connectivity to the management interface of such devices (91). This step (not shown in FIG. 3) should succeed establishing management interface with redundant devices.

Step 2b. Repeat 2a for black listed devices (92). The probability of success is less in this step, but if there had been any transient issues with any of the black listed devices, then it is possible that they could be restored later in the overall procedure.

Step 3. Full restoration of devices (94).

Contrary to the approach adopted in step 2, here the restoration starts from the farthest entity from the management server. This is because, if there had been any drastic configuration change, and if the old configuration is restored, it might lead to inaccessibility of portions of the network for which basic connectivity has just been restored in Step 2.

i. Firstly, interfaces at the periphery of the topology, as determined from the BLT are identified by the BS component; for each interface, the complete BLC is sent; the management application provided in each of the devices ensures that this sent information is used to correctly reconfigure a particular or all the interfaces of a device;

ii. Test connectivity to all the interfaces of the connector using the infrastructures provided by the NMS (e.g. ping) (96);

iii. Walk back from the most peripheral interface, progressively nearer to the NMS interface 14, checking the connectivity with every step to make sure the configuration has been correctly restored (98, 100).

iv. Once all the devices are configured as best as they can be, all the devices are released from the 'Admin down' state to 'Admin up' or fully functioning (102).

A complete connectivity discovery attempt (104) is then made, and the results are compared (106) to the BLT and BLC information which were used as part of the restoration procedure. Such results are stored (108) by an audit element of the BS component, and these are subsequently reported and identify the so-called black-listed devices.

In this restoration process, the reconfiguration can be done through any of the following methods:
1. SNMP set commands.
2. Telnet and device CLI.
3. Any other non standard mechanisms.

By conducting the baselining and restoration of networks according to the above described procedures, the following advantages may follow:

automatic baselining configuration without manual intervention; based on the particular policy employed (i.e. stability threshold determination), the stability of the baselined configuration may be improved;

automatic restoration of the network; validity checking of the restored configuration may help the network administrator from onerous manual investigations and troubleshooting exercises; indeed, the restoration algorithm brings back an operational network from a stable BLT/BLC very swiftly and reliably;

A reduction in Total cost of Ownership (TCO) may be achieved due to the reduction in time required to manage change and configuration tasks in the network, and An overall reduction in network down time may result because of the automatic nature of restoration, and of obtaining BLT/BLC information.

Furthermore, since the configurations of the elements are mostly interdependent, capturing the network connectivity/topology helps the restoration algorithm itself and serves as the reference network operational state to which the network is restored.

It will be appreciated that commercialised forms of the present embodiment would in practice take the form of a set of computer programs adapted to run on general-purpose computing platforms within general-purpose operating environments such as those provided by the Microsoft Windows, Linux or HP-UX operating systems and their related programming libraries and tools. These programs may be marketed in the form of suitably coded computer program products including program code elements that implement the functionality described. It will be appreciated though that the techniques described may equally be implemented as special purpose hardware or any combination of software, hardware and/or firmware.

The invention claimed is:

1. A method of baselining a network topology including at least one network device and one application node from and to which data from said at least one network device may be sent by means of a network protocol, said method comprising:

providing a network-wide time reference;

ensuring clock synchronicity of all network devices and at the application node with said network-wide time reference;

causing configuration information to be collected at the application node from all said network devices at a particular time or within a predetermined time slot;

determining a number of network devices which supplied said configuration information and comparing this number against a stability threshold value; and storing said configuration information together with an indication that such is stable only if the stability threshold value is met or exceeded.

2. A method according to claim 1 wherein a Network Change and Configuration management (NCCM) domain is defined and includes a subset of all the network devices within a complete network topology, said method only being applied to the network devices within said NCCM domain.

3. A method according to claim 2, wherein the configuration information is caused to be collected from the network devices by one of the following three methods:

configuring all the network devices within the NCCM domain to perform a configuration information dump to the application node at the particular time or within a time slot;

issuing a configuration information request from the application node at the particular time to the network devices within the NCCM domain and allowing for said configuration information to be received within a subsequent time slot; or allowing the application node to interrogate all the network devices within the NCCM domain for their configuration information, and receiving their responses at the particular time or within the predetermined time slot.

4. A method according to claim 2 wherein, if less than a total number of NCCM domain devices provide their configuration information in due time, then any configuration information which is received from a network device which is interdependent on one or more further network devices which did not provide configuration information is removed from a snapshot data.

5. A method according to claim 2 wherein NCCM domain topology information is stored in conjunction with a NCCM domain device configuration information such that a baselined topology (BL T) and baselined configuration (BLC) are stored together in an interrelated manner.

6. A method according to claim 1, wherein the stability threshold value is set by a user.

7. A method according to claim 1 wherein the stability threshold value is set automatically at the application node.

8. A method according to claim 1 wherein, in the case where the stability threshold value is met or exceeded, the configuration information is versioned and stored so as to provide a time-stamped snapshot of relevant data.

9. A method according to claim 8 wherein the storage of stable configuration information replaces previously stored stable configuration information from the previous stable iteration.

10. A method according to claim 1 wherein the storage of information is conducted on a persistent retrievable storage medium within or connected to the application node.

11. A method according to claim 10 wherein the persistent retrievable storage medium is a computer server.

12. A method according to claim 1 wherein a failure of a sufficient number of devices to provide their configuration information by a set time or slot results in whatever configuration information had already been received at the application node being disregarded thereby.

13. A method according to claim 1 wherein the network wide time reference is one of the clocks in any one of the network devices or at the application node.

14. A computer program embodied on or in a computer readable non-transitory medium, for carrying out a method of baselining a network topology including at least one network device and one application node from and to which data from said at least one network device may be sent by means of a network protocol, said method comprising:
- providing a network-wide time reference;
- ensuring clock synchronicity of all network devices and at the application node with said network-wide time reference;
- causing configuration information to be collected at the application node from all said network devices at a particular time or within a predetermined time slot;
- determining a number of devices which supplied said configuration information and comparing the number of devices against a stability threshold value; and
- storing said configuration information together with an indication that such is stable, and thus utile in providing a reliable baseline, only if the stability threshold value is met or exceeded.

* * * * *